United States Patent
Wu

(10) Patent No.: US 9,883,662 B2
(45) Date of Patent: Feb. 6, 2018

(54) FISH LURE VOCALIZATION DEVICE

(71) Applicant: TOP CASTLE HOLDINGS LTD., Miami, FL (US)

(72) Inventor: Chung Wen Wu, Keelung (TW)

(73) Assignee: Top Castle Holdings Ltd., Miami, FL (US)

( * ) Notice: Subject to any disclaimer, the term of this patent is extended or adjusted under 35 U.S.C. 154(b) by 141 days.

(21) Appl. No.: 14/955,315

(22) Filed: Dec. 1, 2015

(65) Prior Publication Data

US 2017/0150705 A1   Jun. 1, 2017

(51) Int. Cl.
*A01K 85/01* (2006.01)

(52) U.S. Cl.
CPC .................................... *A01K 85/01* (2013.01)

(58) Field of Classification Search
CPC ................................ A01K 85/01; A01K 93/02
USPC ....................................... 43/17.1, 26.2, 42.31
See application file for complete search history.

(56) References Cited

U.S. PATENT DOCUMENTS

| | | | | |
|---|---|---|---|---|
| 2,784,399 A * | 3/1957 | Smith | .................... | A01K 85/01 340/321 |
| 3,105,233 A * | 9/1963 | D'Amore | ................. | F21L 2/00 200/302.1 |
| 4,951,410 A * | 8/1990 | Ly | .......................... | A01K 79/02 43/17.1 |
| 5,485,697 A * | 1/1996 | Watson | .................. | A01K 85/01 43/17.1 |
| 6,108,963 A | 8/2000 | Lucas et al. | | |
| 6,233,864 B1 | 5/2001 | Mathews, Jr. et al. | | |
| 6,453,599 B2 | 9/2002 | Mathews et al. | | |
| 8,312,669 B2 | 11/2012 | Thomas | | |
| 8,621,776 B2 | 1/2014 | Thomas | | |
| 2011/0030265 A1* | 2/2011 | Mancuso | ............... | A01K 85/01 43/17.1 |
| 2013/0036654 A1 | 2/2013 | Goosey | | |

* cited by examiner

*Primary Examiner* — Darren W Ark
*Assistant Examiner* — Brady W Frazier
(74) *Attorney, Agent, or Firm* — Rosenberg, Klein & Lee

(57) ABSTRACT

The disclosure illustrates a fish lure vocalization device which includes a main body defining an enclosed chamber inside. A vocalization module, a control module and a battery are disposed in the chamber. The vocalization module has a box in which an electromagnet and a metal diaphragm are disposed. The control module is used to control the electromagnet. A magnet is disposed on the metal diaphragm. The magnet is attracted by the electromagnet after the magnetic force is produced by electrifying the electromagnet, to deform the metal diaphragm to make sound. Thereby, the purpose of luring the fish to take the bait may be achieved.

3 Claims, 5 Drawing Sheets

FISH LURE VOCALIZATION DEVICE

BACKGROUND OF THE INVENTION

1. Field of the Invention

The present disclosure relates to a fish lure, and more particularly to a fish lure vocalization device.

2. Description of the Related Art

From ancient times people always use foods as a lure to fish, for example, the foods may be natural flesh of fishes or shrimps. Further, people start to fish by using an artificial lure recently. However, the food-based lure needs to be preserved well, so as to avoid the decay of the lure. On the other hand, the lure is eaten off after catching a fish successfully. According to above two reasons, the fishing costs remain high. Thus, a fish lure device is developed for attracting the fish to take the bait by multiple means, and the fish lure device cannot be eaten and does not need to be frozen, so as to reduce the fish cost.

The conventional fish lure device may have a vocalization device capable of attracting the fish by making a sound. The vocalization devices may be classified into a mechanical type and an electronic type. The vocalization devices disclosed by U.S. Publication No. 2013/0036654 and U.S. Pat. Nos. 6,108,963, 6,233,864 and 6,453,599 are belong to the mechanical type, and they make a sound by hitting the inner components thereof to each other. The vocalization devices disclosed by U.S. Pat. Nos. 8,621,776, and 8,312,669 are belong to the electronic type, and they record sound created by living things in advance and broadcast the sound by a media player.

However, the sound made by the electronic type vocalization device has no effects for the fish underwater, and attracts anglers only. The sound made by the mechanical type vocalization device may attract the fish underwater, but has limit the bait effects because of only monotonous sound by hitting the components and the sound hard to simulate as a sound made by living things. Besides, the anglers may not endure to hear the monotonous sound. As a result, the conventional fish lure vocalization device needs a further improvement.

SUMMARY OF THE INVENTION

An objective of the present disclosure is to provide a fish lure vocalization device, and the fish lure vocalization device can make a sound by bending a metal diaphragm and control the sound's frequency, so as to simulate a sound made by a specific living thing. For example, the sound may be the croak of a frog or the voice of a specific type of fish. In addition, the sound is propagated underwater and can be endured by the anglers.

The other objective of the present disclosure is to provide a fish lure vocalization device capable of amplifying the sound by using a resonance technology, to enhance the effect of attracting the fish.

To achieve aforesaid objectives, the present disclosure provides a fish lure vocalization device which includes a main body, a vocalization module, a control module and a battery. The main body defines a closed chamber inside. The vocalization module is disposed in the chamber and includes a box. The box has an electromagnet and a metal diaphragm, and a magnet is disposed on the metal diaphragm. The magnet is attracted by the electromagnet after the magnetic force is produced by electrifying the electromagnet, so as to deform the metal diaphragm to make sound. The control module includes a control circuit electrically connected with the vocalization module to control the electromagnet. The battery is disposed in the chamber and electrically connected with the control circuit to supply electric power.

Further, the box of the vocalization module defines a first resonance space inside, and a second resonance space is formed between the interior of the chamber of the main body and the exterior of the box.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

DETAILED DESCRIPTION OF THE PREFERRED EMBODIMENTS

Figure 1:
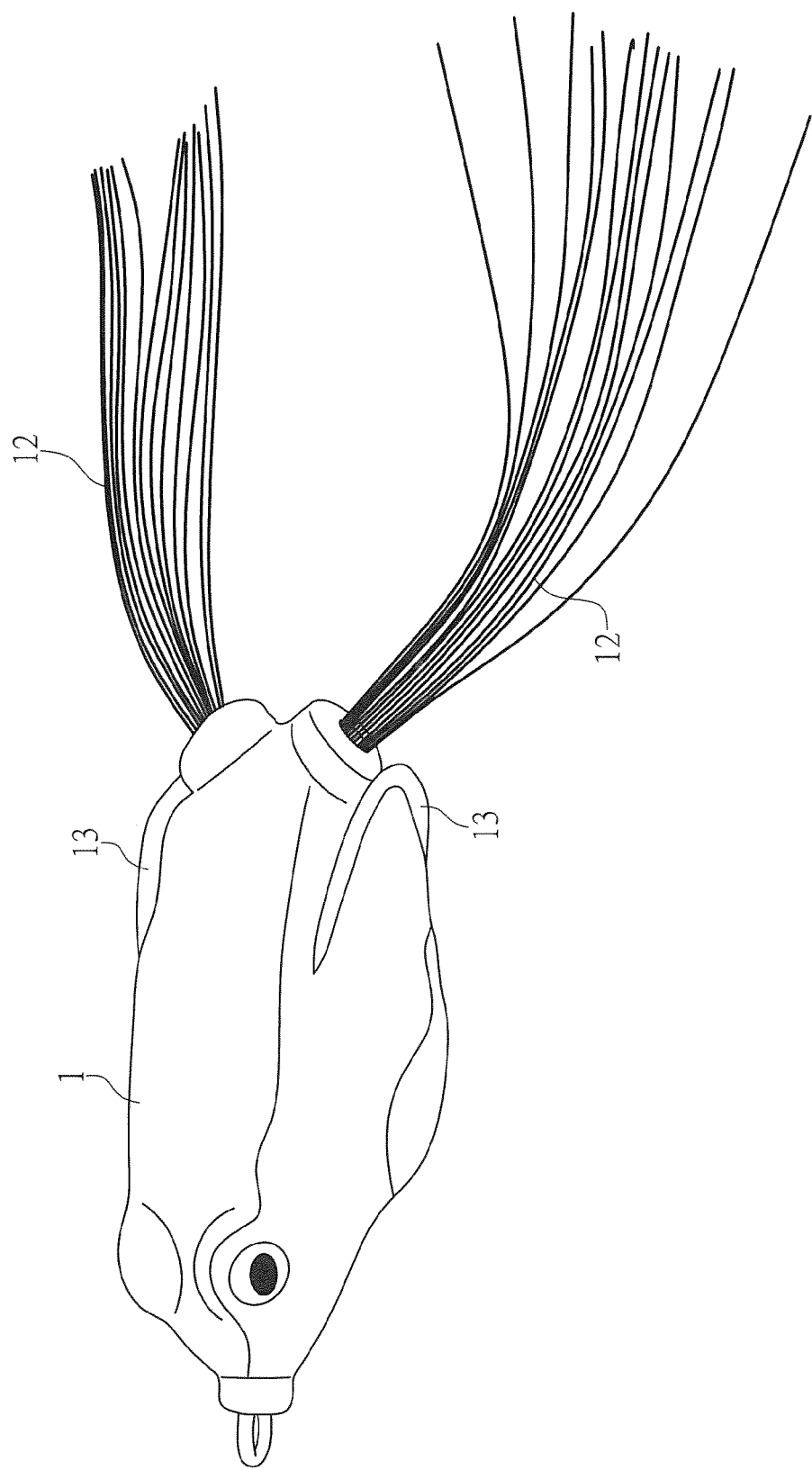
FIG. 1 is a perspective view of the present disclosure.

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

Figure 2:
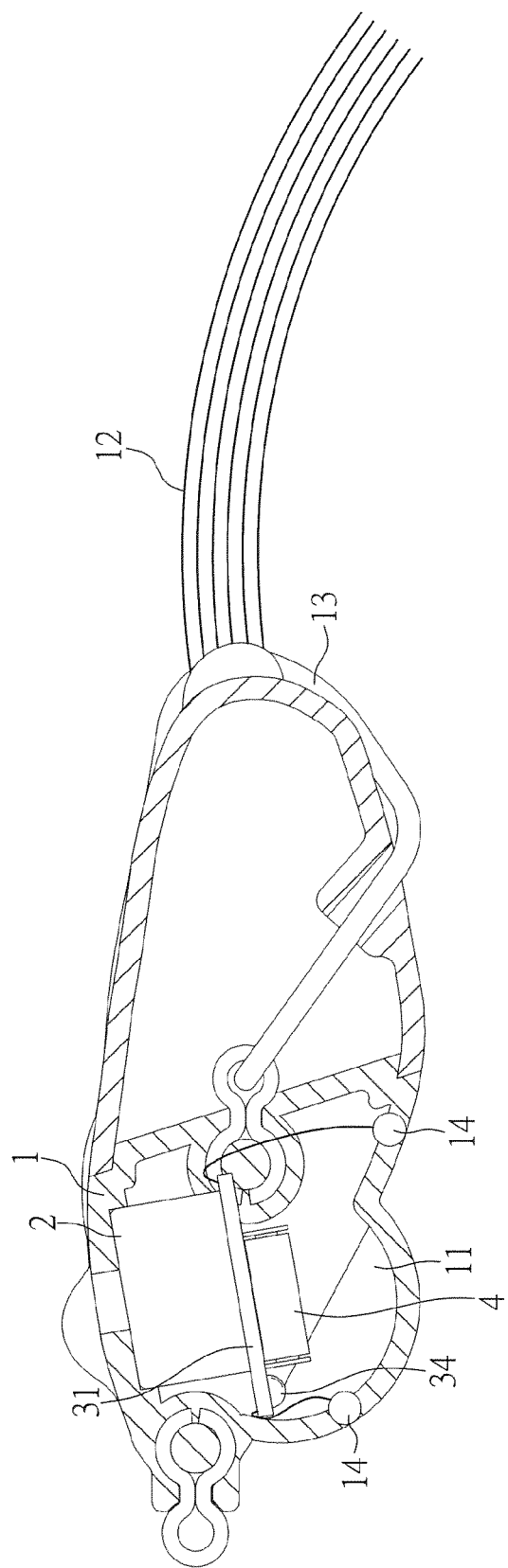
FIG. 2 is a section view of the present disclosure.

Please refer to FIG. 1 and FIG. 2 which illustrate a fish lure vocalization device of the present disclosure. The fish lure vocalization device has a main body 1. In the present embodiment, the exterior of the main body 1 is in a frog shape. The main body 1 defines a closed chamber 11 inside a front end thereof, and a vocalization module 2, a control module and a battery 4 are disposed in the chamber 11. The control module includes a circuit board 31, and the vocalization module 2 and the battery 4 are disposed on the circuit board 31. The main body 1 has a color bar 12 and a fishhook 13 at a back end thereof.

Figure 3:
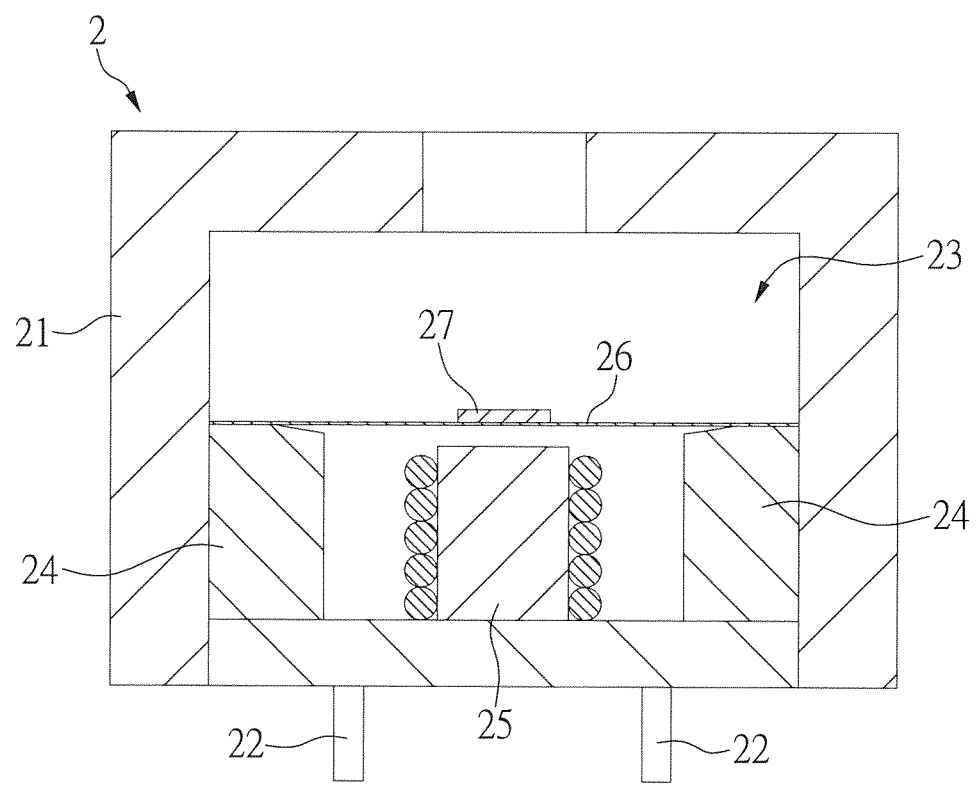
FIG. 3 is a section view of a vocalization module of the present disclosure.

As shown in FIG. 3, the vocalization module 2 includes a box 21 and two pins 22 are extended out of the box 21 to connect to the circuit board. A first resonance space 23 is formed in the box 21, and the box 21 includes two insulators 24, an electromagnet 25 and a metal diaphragm 26. The two insulators 24 are disposed in interval, and the electromagnet 25 is disposed between the two insulators. The height of the electromagnet 25 is lower than that of the two insulators 24. Two insulators 24 are straddled by the metal diaphragm 26, and an interval is formed between the metal diaphragm 26 and the electromagnet 25. Further, a magnet 27 is disposed on a position of the metal diaphragm 26 corresponding to the electromagnet 25.

Figure 4:
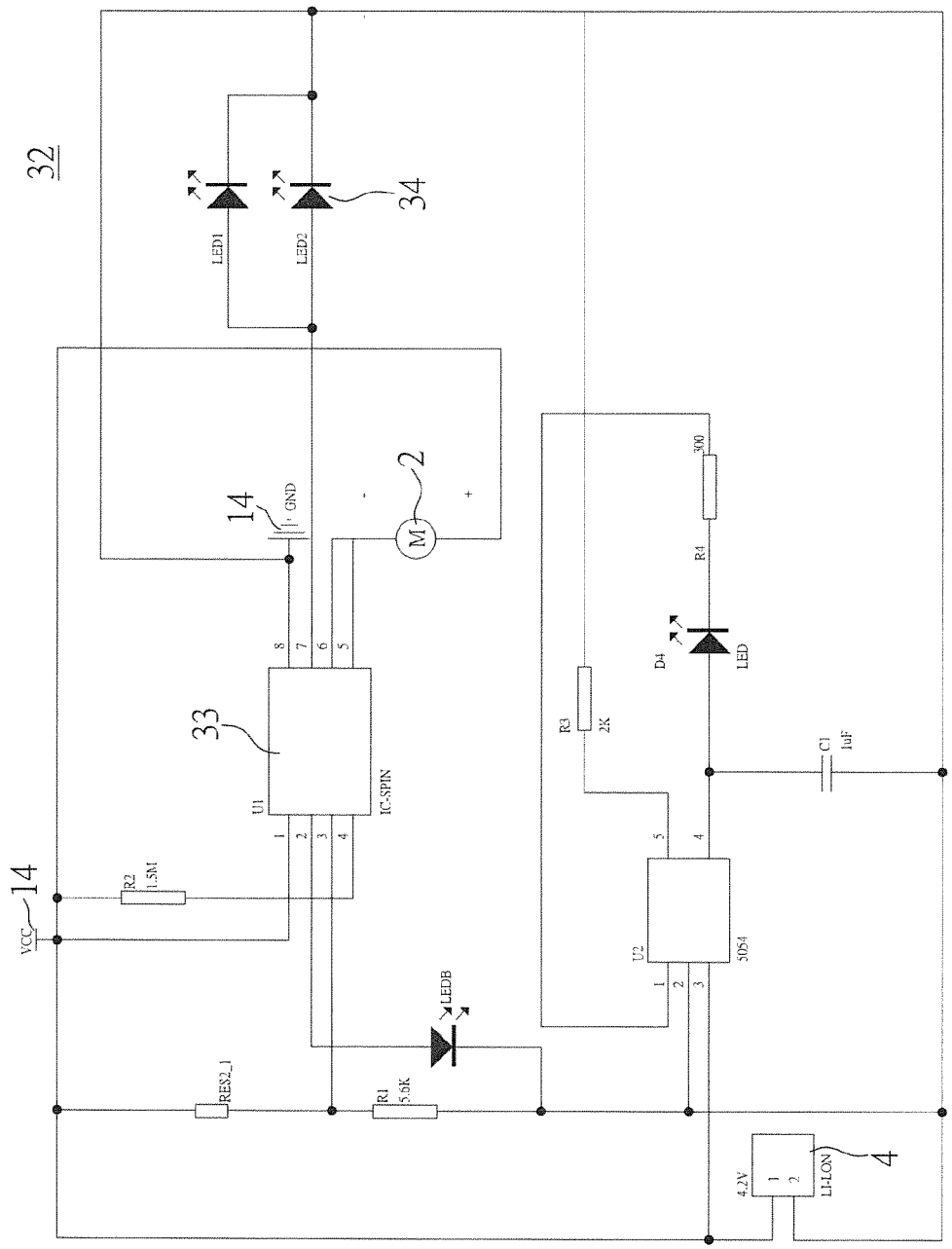
FIG. 4 is a circuit view of a control module of the present disclosure.

As shown in FIG. 4, the circuit board of the control module includes a control circuit 32 which is electrically connected to the vocalization module 2 by the two pins, and has a programmable logic device 33 used for controlling the electromagnet. The battery 4 is electrically connected to the control circuit 32, so as to supply the electric power. Further, the battery 4 may be a rechargeable lithium battery in the present embodiment.

On the other hand, as shown in FIG. 1 and FIG. 4, the control circuit 32 has two contacts 14 disposed at different positions on the main body 1 and not connected to each other, such that the control circuit becomes a broken circuit normally. Further, when the fish lure vocalization device is in water and the main body 1 is covered by the water, the two contacts 14 may be electrically connected to each other through the water's conductivity, and then the control circuit may be conducted, so as to drive the control module to operate.

And, the battery 4 may be charged by the two contacts 14. In particular, by connecting the two contacts 14 to two electrodes of an external power supply, the electric power may be charged into the battery 4. Thus, the fish lure vocalization device of the present disclosure may be used repeatedly.

Figure 5:
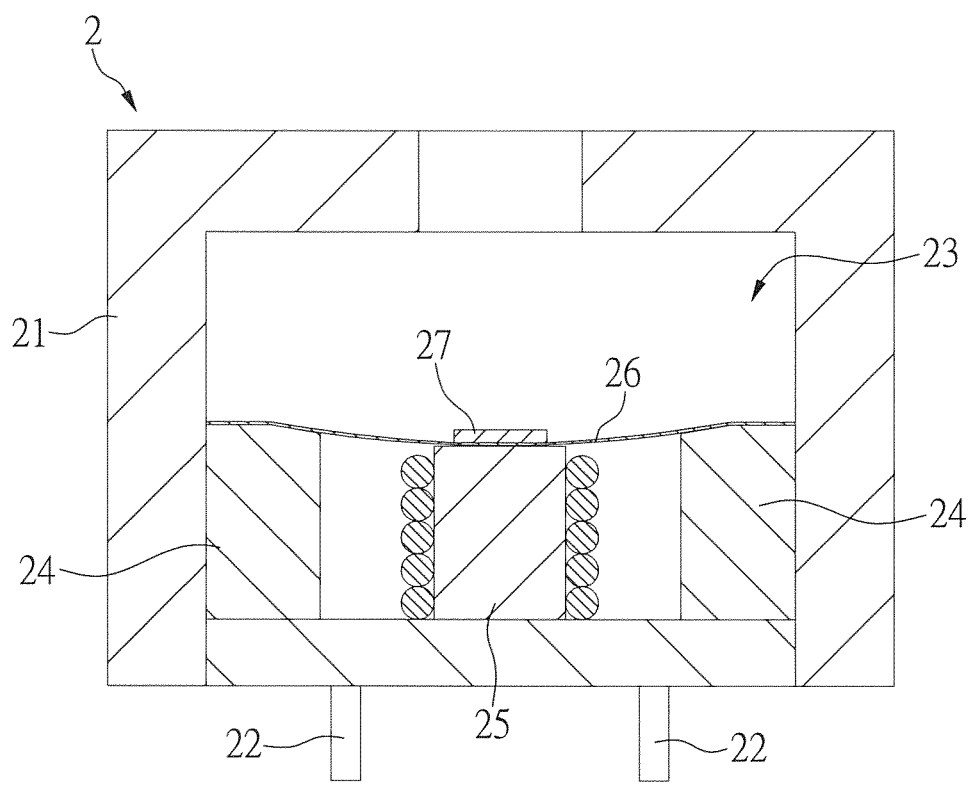
FIG. 5 is a section view of a using state of a vocalization module of the present disclosure.

When the control module starts to operate, the operating of the electromagnet can be controlled by a program of the programmable logic device. As shown in FIG. 5, when a magnetic force is generated by electrifying the electromagnet 25, the magnet 27 on the metal diaphragm 26 is attracted by the electromagnet 25 and then approach to the electromagnet 25. Thereby, the magnet 27 will drive the metal diaphragm 26 to have a bending deformation, so as to make sound. On the contrary, when the electricity supply of the electromagnet 25 is cut off, the magnetic force is disappeared and the magnet 27 is not affected by the magnetic force. So the metal diaphragm 26 will restore to the original status which is shown in FIG. 3, and the sound may still be made by the metal diaphragm 26 during the restoring period. With the sound made by using the metal diaphragm in above two stages, the effect of luring the fish can be achieved. Further, different control programs may be programmed into the programmable logic device, and the operating frequency of the electromagnet 25 may be changed, to change the vocalization frequency of the metal diaphragm 26. Thus, a variety of sounds may be made. Even, the sound may be a simulated sound of a living thing, such as the croak of a frog or the voice of a specific type of fish, to enhance the effect of attracting the fish.

The sound made by the metal diaphragm 26 may form resonance in the first resonance space 23 of the box 21, so as to amplify the sound. Further, as shown in FIG. 2, the second resonance space is formed in the space 11 between the interior of the chamber of the main body 1 and the exterior of the box 21. After the aforesaid sound is transmitted from the first resonance space to the chamber 11, second resonance may be formed in the chamber 11 again, so as to amplify the sound again. Thereby, the effect of attracting the fish may be enhanced further.

Besides, in the present embodiment, the control module may further include a light-emitting unit 34 on the control circuit 32, for example, a light-emitting diode may be an example of the light-emitting unit 34. Thereby, the effect of attracting the fish may be generated by emitting lights. Further, the programmable logic device 33 may also control the emitting frequency of the light-emitting unit 34, so as to enhance the effects.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A fish lure vocalization device, comprising:
   a main body defining an enclosed chamber therein;
   a vocalization module disposed in the chamber and including a box in which an electromagnet and a metal diaphragm are disposed, wherein a magnet is disposed on the metal diaphragm, and the magnet is displaced responsive to a magnetic force produced by electrifying the electromagnet, to deform the metal diaphragm to directly generate sound by bending, the magnet and electromagnet being disposed at opposite sides of the metal diaphragm;
   a control module having a control circuit electrically connected to the vocalization module to control the electromagnet; and,
   a battery disposed in the chamber and electrically connected to the control circuit to supply electric power;
   wherein the box of the vocalization module defines a first resonance space inside, a second resonance space is formed within the chamber of the main body and external to the box, two insulators are disposed in the first resonance space separated by an interval therebetween, the electromagnet is disposed between the two insulators, and the metal diaphragm contacts each of the two insulators such that the metal diaphragm spans the interval between the two insulators.

2. The fish lure vocalization device according to claim 1, wherein the battery is a rechargeable battery, the control circuit has two contacts disposed on the main body and spaced from each other, to make the control circuit form a broken circuit.

3. The fish lure vocalization device according to claim 1, wherein the control module has at least one light-emitting unit.

* * * * *